(12) United States Patent
Chaudhry (10) Patent No.: US 10,895,387 B2
(45) Date of Patent: Jan. 19, 2021

(54) HYBRID HEAT PUMP WATER HEATERS

(71) Applicant: Rheem Manufacturing Company, Atlanta, GA (US)

(72) Inventor: Raheel A. Chaudhry, Montgomery, AL (US)

(73) Assignee: Rheem Manufacturing Company, Atlanta, GA (US)

(*) Notice: Subject to any disclaimer, the term of this patent is extended or adjusted under 35 U.S.C. 154(b) by 482 days.

(21) Appl. No.: 15/812,358

(22) Filed: Nov. 14, 2017

(65) Prior Publication Data

US 2019/0145634 A1    May 16, 2019

(51) Int. Cl.
| | |
|---|---|
| *F24D 19/10* | (2006.01) |
| *F24H 1/20* | (2006.01) |
| *F24H 9/20* | (2006.01) |
| *F24D 11/02* | (2006.01) |
| *F24H 4/04* | (2006.01) |

(52) U.S. Cl.
CPC ...... *F24D 19/1069* (2013.01); *F24D 11/0228* (2013.01); *F24H 1/202* (2013.01); *F24H 4/04* (2013.01); *F24H 9/2021* (2013.01); *F24D 2200/32* (2013.01)

(58) Field of Classification Search
None
See application file for complete search history.

(56) References Cited

U.S. PATENT DOCUMENTS

| | | | | |
|---|---|---|---|---|
| 2,716,866 | A * | 9/1955 | Silva | F24H 4/04 62/196.4 |
| 3,999,709 | A * | 12/1976 | Estabrook | F24D 3/08 237/8 R |
| 4,091,994 | A * | 5/1978 | Madsen | F25B 29/00 237/2 B |
| 4,175,698 | A * | 11/1979 | Brosenius | F24D 19/1009 237/19 |
| 4,290,275 | A * | 9/1981 | Disco | F24H 4/04 122/4 R |
| 4,363,221 | A * | 12/1982 | Singh | F24D 17/02 62/238.6 |
| 4,385,723 | A * | 5/1983 | Sanborn | F24D 17/02 122/14.22 |
| 4,416,222 | A * | 11/1983 | Staats | F24D 17/00 122/19.1 |
| 4,436,058 | A * | 3/1984 | McAlister | F24D 11/0214 122/19.1 |
| 4,498,622 | A * | 2/1985 | Harnish | F24D 19/1054 122/14.3 |

(Continued)

*Primary Examiner* — Thor S Campbell
(74) *Attorney, Agent, or Firm* — Troutman Pepper Hamilton Sanders LLP (57) ABSTRACT

A water heater can include a tank, an inlet line, and an outlet line, where the inlet line provides unheated water to the tank, and where the outlet line draws heated water from the tank for a hot water demand. The water heater can also include a heat pump disposed adjacent to a first portion of the tank, where the heat pump applies heat to transform the unheated water to heated water in the first portion of the tank. The water heater can further include a resistive heating element disposed within a second portion of the tank, where the resistive heating element further applies heat to transform the unheated water to heated water in the second portion of the tank.

11 Claims, 5 Drawing Sheets

(56) References Cited

U.S. PATENT DOCUMENTS

| | | | | |
|---|---|---|---|---|
| 4,540,874 A * | 9/1985 | Shaffer, Jr. | F24D 19/1054 | 165/241 |
| 4,543,468 A * | 9/1985 | Shaffer, Jr. | F24D 19/1054 | 122/14.22 |
| 4,645,908 A * | 2/1987 | Jones | F24D 11/0214 | 392/340 |
| 4,740,673 A * | 4/1988 | Robinson, Jr. | F24D 19/1054 | 219/510 |
| 4,798,240 A * | 1/1989 | Gerstmann | F24D 3/08 | 165/48.1 |
| 4,959,975 A * | 10/1990 | Harris | F24H 4/04 | 62/238.6 |
| 5,076,494 A * | 12/1991 | Ripka | F24H 1/48 | 126/101 |
| 5,220,807 A * | 6/1993 | Bourne | F24D 17/02 | 165/58 |
| 5,233,970 A * | 8/1993 | Harris | F24D 3/082 | 122/14.22 |
| 5,255,338 A * | 10/1993 | Robinson, Jr. | G05D 23/1919 | 219/510 |
| 5,367,602 A * | 11/1994 | Stewart | F24D 17/02 | 237/2 B |
| 5,495,551 A * | 2/1996 | Robinson, Jr. | F24D 19/1054 | 165/240 |
| 5,596,952 A * | 1/1997 | Lannes | F24D 3/082 | 122/14.1 |
| 5,906,109 A * | 5/1999 | Dieckmann | F24H 4/04 | 237/2 B |
| 6,080,971 A * | 6/2000 | Seitz | F24H 9/2028 | 219/483 |
| 6,212,894 B1 * | 4/2001 | Brown | F24D 19/1054 | 236/20 R |
| 6,640,047 B2 * | 10/2003 | Murahashi | F24H 1/18 | 126/344 |
| 7,334,419 B2 * | 2/2008 | Gordon | F24H 4/04 | 62/238.7 |
| 7,543,456 B2 * | 6/2009 | Sinha | F24H 4/04 | 285/139.1 |
| 8,422,870 B2 * | 4/2013 | Nelson | F24H 4/04 | 392/461 |
| 9,109,811 B2 * | 8/2015 | Duplessis | F24H 4/04 | |
| 9,404,690 B2 * | 8/2016 | Duplessis | F28D 1/06 | |
| 9,541,305 B2 * | 1/2017 | Shaffer | F24H 9/2021 | |
| 9,664,411 B2 * | 5/2017 | Shaffer | F24H 1/0018 | |
| 9,869,475 B2 * | 1/2018 | Farris | F24D 19/1054 | |
| 10,619,864 B2 * | 4/2020 | Luo | F24D 19/1081 | |
| 2006/0213210 A1 * | 9/2006 | Tomlinson | F24H 4/04 | 62/238.6 |
| 2008/0257281 A1 * | 10/2008 | Pepper | F24H 9/2021 | 122/14.1 |
| 2011/0058795 A1 * | 3/2011 | Kleman | F24H 9/2021 | 392/308 |

\* cited by examiner

HYBRID HEAT PUMP WATER HEATERS

TECHNICAL FIELD

The present disclosure relates generally to water heaters, and more particularly to systems, methods, and devices for hybrid heat pump water heaters.

BACKGROUND

Water heaters are generally used to provide a supply of hot water. Water heaters can be used in a number of different residential, commercial, and industrial applications. A water heater can supply hot water to a number of different processes. For example, a hot water heater in a residential dwelling can be used for an automatic clothes washer, an automatic dishwasher, one or more showers, and one or more sink faucets. Every storage-type water heater has a limited capacity, and so when one or more processes use hot water at one time, there may be limited or no hot water available from the storage-type water heater until the water heater has sufficient time to heat more water.

SUMMARY

In general, in one aspect, the disclosure relates to a water heater. The water heater can include a tank and an inlet line that delivers unheated water to the tank. The water heater can also include an outlet line that draws heated water from the tank for a hot water demand. The water heater can further include a heat pump disposed adjacent to a first portion of the tank, where the heat pump applies heat to transform the unheated water to heated water in the first portion of the tank. The water heater can also include a supplemental heat source disposed within a second portion of the tank, where the supplemental heat source further applies heat to transform the unheated water to heated water in the second portion of the tank.

In another aspect, the disclosure can generally relate to a controller that includes a control engine. The control engine can be configured to communicate with multiple sensor devices to receive multiple measurements associated with heated water within a tank of a water heater. The control engine can also be configured to determine, using the measurements, how much heated water is currently available within the tank of the water heater. The control engine can further be configured to control a heat pump and a supplemental heat source of the water heater to regulate a temperature of the heated water within the tank.

In yet another aspect, the disclosure can generally relate to a non-transitory computer-readable medium comprising instructions that, when executed by a hardware processor, perform a method for providing uniformly heated water throughout a tank of a heat pump water heater. The method can include receiving a first instruction to operate in a first mode. The method can also include measuring, using multiple sensor devices, multiple temperatures at a plurality of locations in the tank. The method can further include determining that a difference between two of the temperatures exceeds a threshold value. The method can also include operating, in response to determining that the difference exceeds the threshold value, a component of a heating system of the heat pump water heater that is idle. The method can further include determining, while operating the component of the heat pump, that the difference no longer exceeds the threshold value. The method can also include ceasing, while the difference no longer exceeds the threshold value, to operate the component of the heat pump water heater.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

In general, example embodiments provide systems, methods, and devices for controlling the supply of hot water (also called heated water herein) in a hybrid heat pump storage-type water heater. Example embodiments can be used for any size (e.g., capacity) of water heater. Further, example embodiments can be located in any type of environment (e.g., warehouse, attic, garage, storage, mechanical room, basement) for any type (e.g., commercial, residential, industrial) of user. Example hybrid heat pump water heaters can be used for one or more of any number of processes (e.g., automatic clothes washers, automatic dishwashers, showers, sink faucets, heating systems, humidifiers).

Example embodiments are designed to make the temperature of the water within a tank of a heat pump water heater more uniform more quickly. In other words, example embodiments are designed to bring the temperature of unheated water toward the bottom of the tank closer to the temperature of the heated water toward the top of the tank more quickly. This goal is accomplished by adding at least one electric heating element toward the bottom of the tank that, in the current art, exclusively uses a heat pump to heat fluid within the tank.

Water heater systems (or components thereof, including controllers) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of a water heater system (or portions thereof) described herein can be made from a single piece (as from a mold, injection mold, die cast, or extrusion process). In addition, or in the alternative, components of a water heater system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of hybrid heat pump water heaters, one or more of the components shown may be omitted, repeated, and/or substituted. Accordingly, example embodiments of hybrid heat pump water heaters should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein. The numbering scheme for the various components in the figures herein is such that each component is a three digit number, and corresponding components in other figures have the identical last two digits.

In some cases, example embodiments can be subject to meeting certain standards and/or requirements. Examples of entities that set and/or maintain standards include, but are not limited to, the Department of Energy (DOE), the National Electric Code (NEC), the National Electrical Manufacturers Association (NEMA), the International Electrotechnical Commission (IEC), the American Society of Mechanical Engineers (ASME), the National Fire Protection Association (NFPA), the American Society of Heating, Refrigeration and Air Conditioning Engineers (ASHRAE), Underwriters' Laboratories (UL), and the Institute of Electrical and Electronics Engineers (IEEE). Use of example embodiments described herein meet (and/or allow a corresponding water heater system or portion thereof to meet) such standards when required.

As used herein, the term "equalization" refers to the operation performed by example embodiments where the difference between the water temperature toward the top of the tank of a water heater and the water temperature toward the bottom of the tank of the water heater is reduced. The temperature differential is not necessarily brought to zero using example embodiments. Instead, some example embodiments can reduce the difference to with a range (e.g., within 5° C., within 3° F.) and still be considered equalized. The term "hybrid" is used to convey that the heating system of example heat pump water heaters includes a heat pump and at least one supplemental component (e.g., a resistive heating element).

Example embodiments of hybrid heat pump water heaters will be described more fully hereinafter with reference to the accompanying drawings, in which example embodiments of hybrid heat pump water heaters are shown. Hybrid heat pump water heaters may, however, be embodied in many different forms and should not be construed as limited to the example embodiments set forth herein. Rather, these example embodiments are provided so that this disclosure will be thorough and complete, and will fully convey the scope of hybrid heat pump water heaters to those of ordinary skill in the art. Like, but not necessarily the same, elements (also sometimes called components) in the various figures are denoted by like reference numerals for consistency.

Terms such as "first", "second", "third", "height", "top", "bottom", "side", and "within" are used merely to distinguish one component (or part of a component or state of a component) from another. Such terms are not meant to denote a preference or a particular orientation, and are not meant to limit embodiments of hybrid heat pump water heaters. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1A:
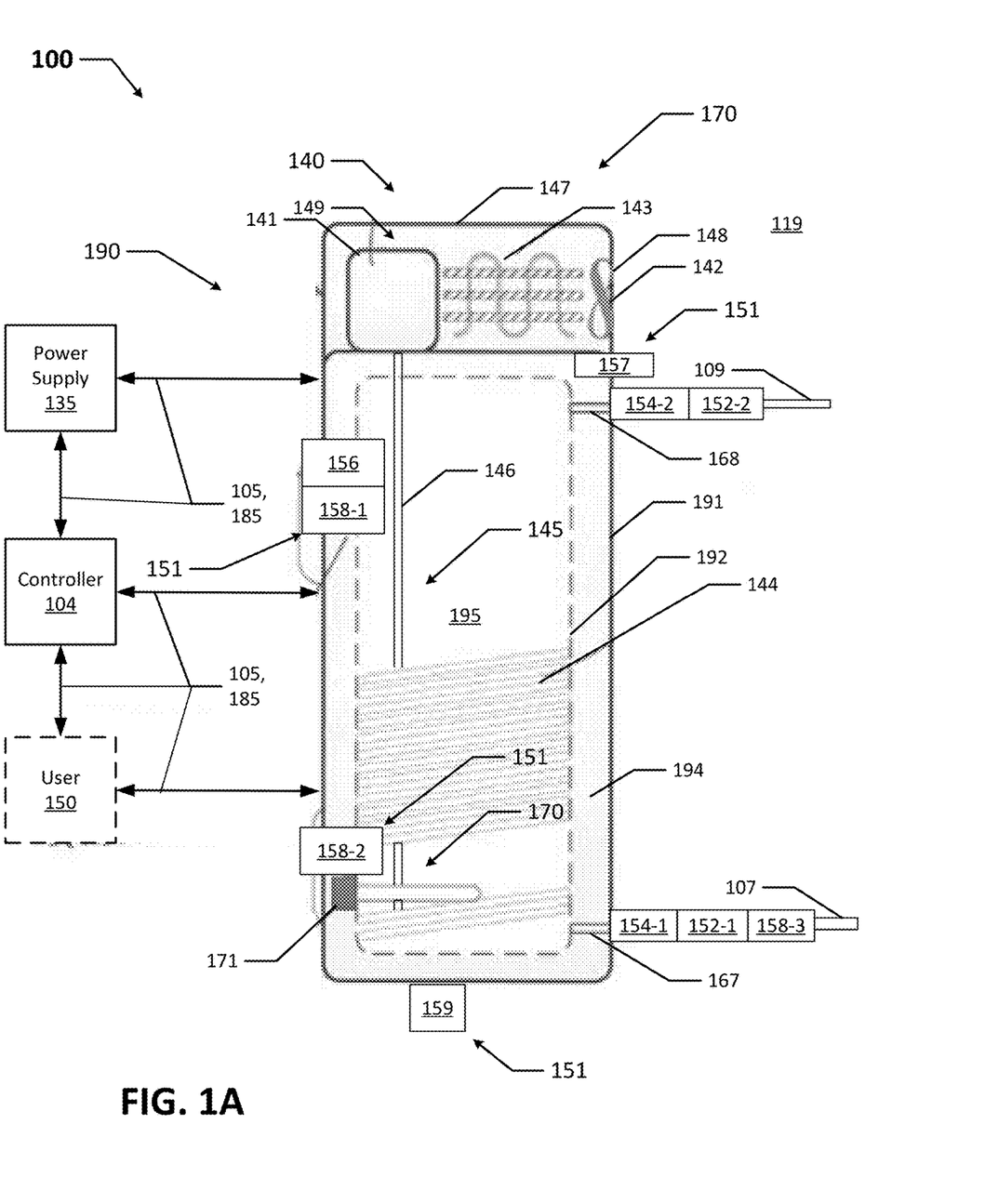
FIGS. 1A and 1B show diagrams of a system that includes a hybrid heat pump water heater in accordance with certain example embodiments.
Figure 1B:
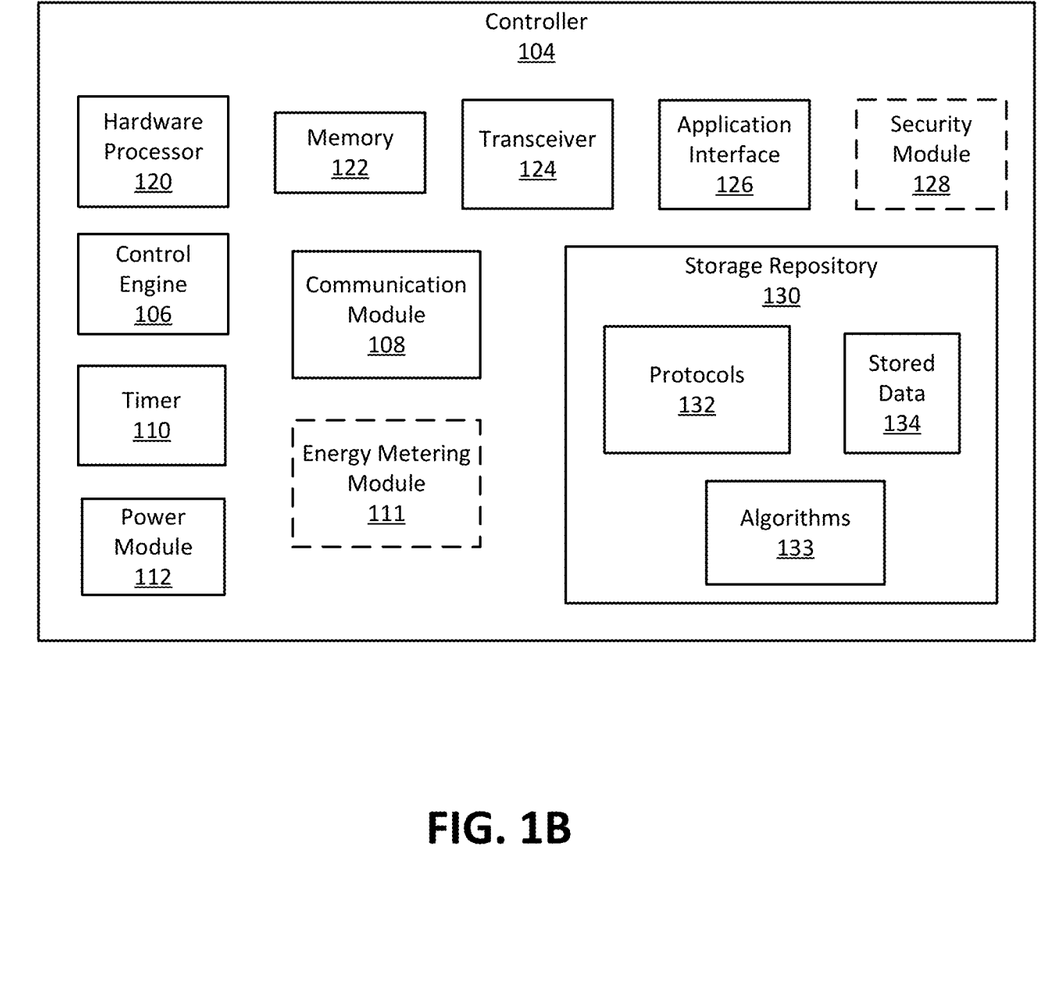

FIGS. 1A and 1B show diagrams of a water heating system 100 that includes a water heater 190 that is controlled by a controller 104 in accordance with certain example embodiments. Specifically, FIG. 1A shows the water heating system 100, and FIG. 1B shows a detailed system diagram of the controller 104. As shown in FIGS. 1A and 1B, the water heating system 100 can include the water heater 190, the controller 104, an inlet line 107, an outlet line 109, sensors 151, a power supply 135, and a user 150.

The water heater 190 is shown in a cross-sectional side view in FIG. 1A and can include one or more sensor devices 151 (also sometimes called sensor modules or sensors), an inlet fitting 167, an outlet fitting 168, a tank 195, and a heating system 170, which includes a heat pump assembly 140 and a resistive heating element 171 (a type of supplemental heating source). The heat pump assembly 140 of the heating system 170 can include one or more of a number of components. In this case, the heat pump assembly 140 includes a compressor 141, an air moving device 142, an evaporator 143, and a coil 145, which can include an outflow portion 144 and an inflow portion 146.

As shown in FIG. 1B, the controller 104 can include one or more of a number of components. Such components, can include, but are not limited to, a control engine 106, a communication module 108, a timer 110, an optional energy metering module 111, a power module 112, a storage repository 130, a hardware processor 120, a memory 122, a transceiver 124, an application interface 126, and, optionally, a security module 128. The components shown in FIGS. 1A and 1B are not exhaustive, and in some embodiments, one or more of the components shown in FIGS. 1A and 1B may not be included in an example system. Further, one or more components shown in FIGS. 1A and 1B can be rearranged. For example, some or all of the inlet line 107 can be part of the water heater 190. Any component of the example water heating system 100 can be discrete or combined with one or more other components of the water heating system 100.

A user 150 may be any person or entity that interacts with the water heater 190 and/or the controller 104. Examples of a user 150 may include, but are not limited to, an engineer, an appliance or process that uses heated water, an electrician, an instrumentation and controls technician, a mechanic, an operator, a consultant, an electric utility, a grid operator, a retail electric provider, an energy marketing company, load forecasting software, a weather forecasting service, a network manager, a labor scheduling system, a contractor, a homeowner, a landlord, a building management company, and a manufacturer's representative. There can be one or multiple users 150, and it should be understood that the user 150 is not a required aspect of the water heater 190.

The user 150 can use a user system (not shown), which may include a display (e.g., a GUI). The user 150 can interact with (e.g., sends data to, receives data from) the controller 104 via the application interface 126 (described below). The user 150 can also interact with the water heater 190 (including any components thereof, including one or more of the sensor devices 151) and/or the power supply 135. Interaction between the user 150, the controller 104, the water heater 190, and the power supply 135 is conducted using signal transfer links 105 and/or power transfer links 185.

Each signal transfer link 105 and each power transfer link 185 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, Zigbee, mobile apps, text/email messages, cellular networking, Bluetooth, WirelessHART, ISA100) technology. For example, a signal transfer link 105 can be (or include) one or more electrical conductors that are coupled to the controller 104 and to a sensor device 151 of the water heater 190. A signal transfer link 105 can transmit signals (e.g., communication signals, control signals, data) between the controller 104, the user 150, the water heater 190 (including components thereof), and/or the power supply 135.

Similarly, a power transfer link 185 can transmit power between the controller 104, the user 150, the water heater 190 (including components thereof), and/or the power supply 135. One or more signal transfer links 105 and/or one or more power transfer links 185 can also transmit signals and power, respectively, between components (e.g., temperature sensor 158-2, flow sensor 154-1) within the water heater 190 and/or within the controller 104.

The power supply 135 provides power, directly or indirectly, to one or more components (e.g., the sensor devices 151, the controller 104, the heating system 170) of the water heating system 100. The power supply 135 can include one or more components (e.g., a transformer, a fuse) that receives power (for example, through an electrical cable) from an independent power source external to the heating system 100 and generates power of a type (e.g., AC, DC) and level (e.g., 240V, 120V) that can be used by one or more components of the heating system 100. For example, the power supply 135 can provide 240V AC power. In addition, or in the alternative, the power supply 135 can be a source of power in itself. For example, the power supply 135 can be or include a battery, a localized photovoltaic power system, or some other source of independent power. In certain example embodiments, the power supply 135 delivers 240 VAC.

As stated above, the water heater 190 in this example includes a heat pump assembly 140 (or, more simply, a heat pump 140), multiple sensor devices 151, an inlet fitting 167, an outlet fitting 168, a tank 195, and a heating system 170. The water heater 190 has an outer wall 191 and an inner wall 192, where the inner wall 192 forms the tank 195. Between the outer wall 191 and the inner wall 192 can be disposed insulation 194 to help the tank 195 to retain heat longer. The inlet fitting 167 can be disposed within the insulation 194 on a side of the water heater 190 and couple to the inlet line 107 at its outer end. The outlet fitting 168 can also be disposed within the insulation 194 on a side of the water heater 190 and couple to the outlet line 109 at its outer end. In alternate examples, one or both of the inlet fitting 167 and the outlet fitting 168 are disposed at the top end of the water heater 190. In such alternate examples, there can also be a tube inside of the tank 195 that is coupled to the inner end of the inlet fitting 167.

The inlet line 107 can be a pipe or other vessel that delivers unheated water to the tank 195 of the water heater 190. The distal end of the inlet line 107 is coupled, directly or indirectly, to the outer end of the inlet fitting 167. As discussed above, the inner end of the inlet fitting 167 can be coupled to the proximal end of a another tube, which can be disposed entirely within the water heater 190. Such a tube can allow for the flow of unheated water into the tank 195 of the water heater 190. Alternatively, the inner end of the ilet fitting 167 can have no tube coupled to it. The outer wall 191 and the inner wall 192 of the water heater 190 have an aperture in which the inlet fitting 167 can be disposed therein. The inlet fitting 167 is positioned toward the bottom of the tank 195. This configuration allows unheated water to flow from an external source into the tank 195 of the water heater 190 without drastically reducing the temperature of the heated water already in the tank 195.

Similarly, the outlet line 109 can be a pipe or other vessel that can allow for the heated water in the tank 195 to flow out of the water heater 190. The outlet line 109 has a distal end that can be disposed at any point within the tank 195. Typically, as in this case, the distal end of the outlet line 109 is disposed near the top end of the tank 195. The outer wall 191 and the inner wall 192 of the water heater 190 have an aperture in which the outlet fitting 168 can be disposed. A segment of the outlet line 109 can be coupled to the inner end of the outlet fitting 168, allowing that segment of the outlet line 109 to extend into the tank 195. The remainder of the outlet line 109 is coupled to the outer end of the outlet fitting 168. The outlet fitting 168 is positioned toward the top of the tank 195, where the heated water is sure to be disposed within the tank 195. This configuration allows heated water in the tank 195 to be drawn from the tank 195 of the water heater 190 so that the heated water can be delivered to one or more of a number of devices (e.g., clothes washer, dishwasher, faucets, shower heads) that use the heated water.

Each of the sensor devices 151 can measure one or more of a number of parameters. Examples of types of sensors 151 can include, but are not limited to, temperature sensor, a pressure sensor, a flow rate sensor, a scale, a voltmeter, an ammeter, a power meter, an ohmmeter, an electric power meter, and a resistance temperature detector. A sensor 151 can also include one or more components and/or devices (e.g., a potential transformer, a current transformer, electrical wiring, a transducer) related to the measurement of a parameter.

A parameter that can be measured by a sensor device 151 can include, but is not limited to, pressure, flow rate, current, voltage, power, resistance, weight, and temperature. In certain example embodiments, the parameter or parameters measured by a sensor device 151 can be used by the controller 104 to determine an amount of heated water that is currently available within the tank 195 of the water heater 190 and/or how long it will take for an amount of heated water within the tank 195 of the water heater 190 to become available. Each sensor device 151 can use one or more of a number of communication protocols. A sensor device 151 can be a stand-alone device or integrated with another component (e.g., the heating system 170) in the system 100. A sensor device 151 can measure a parameter continuously, periodically, based on the occurrence of an event, based on a command received from the control module 106 of the controller 104, and/or based on some other factor.

In this example, there are three temperature sensors 158, at least one flow sensor 154, and a water leak sensor 159. The water leak sensor 159 is disposed toward the bottom end of the water heater 190 and detects a leak in the tank 195 of the water heater 190. The flow sensor 154-1 measures the rate of flow of unheated water in the inlet line 107 when entering the tank 195. Temperature sensor 158-1 is located toward the top end (e.g., approximately ¼ the height of the tank 195 from the top end of the tank 195) and measures the temperature of the water (e.g., heated water, unheated water, mixture of heated water and unheated water) in the tank 195 at that point. This temperature measured by temperature sensor 158-1 can be an indication of the maximum temperature of the heated water in the tank 195, although, since heat rises, the temperature of the heated water in the tank 195 above the temperature sensor 158-1 is same or higher than the temperature measured by the temperature sensor 158-1.

Temperature sensor 158-2 is located toward the bottom end (e.g., approximately ¼ the height of the tank 195 from the bottom end of the tank 195) and measures the temperature of the water (e.g., heated water, unheated water, mixture of heated water and unheated water) in the tank 195 at that point. Since heat rises, the temperature measured by temperature sensor 158-2 can be no greater than the temperature measured by the temperature sensor 158-1. If this event occurs, the controller 104 can determine that temperature sensor 158-1 and/or temperature sensor 158-2 are faulty and require maintenance and/or replacement. Temperature sensor 158-3 measures the temperature of the unheated water in the inlet line 107 before the unheated water flows into the tank 195. The controller 104 uses the measurements made by some or all of the foregoing sensors to determine such things as the amount of heated water available in the tank 195 for immediate use and how long it will take for a certain amount of heated water to become available in the tank 195.

The water heater 190 can also include one or more valves 152. In this example, the water heater 190 includes a valve 152-1 that controls the rate of flow (or the flow itself) of the unheated water in the inlet tube 107, as well as an optional valve 152-2 that controls the rate of flow (or the flow itself) of heated water in the outlet tube 109. In certain example embodiments, the position (e.g., fully open, fully closed, 30% open) of a valve 152 can be controlled by the controller 104. The water heater 190 can further include a switch 156 (also called, for example, an emergency cutout switch 156, a cutout switch 156, and an ECO 156) that controls the energy (e.g., electrical power, gas) delivered to the heating system 170. The switch 156 can have an open position (preventing energy from flowing to the heating system 170) and a closed position (allowing energy to flow to the heating system 170). The position and operation of the switch 156 is independent of the controller 104.

The water heater 190 can also include a temperature and pressure relief valve 157 that is disposed in the top of the tank 195, the top of the outer wall 191, and the insulation disposed therebetween. The relief valve 157 can be a purely mechanical device (e.g., not controlled by the controller 104) that detects when the pressure and/or temperature within the tank 195 exceeds a threshold value for that parameter. If such an event were to occur, the relief valve 157 would operate from a normally-closed position to an open position.

If the relief valve 157 determines that the pressure within the tank 195 exceeds a maximum threshold value, then the relief valve 157 opens to allow the excess pressure to vent out the top of the water heater 190 into the ambient environment. When the pressure within the tank 195 measured by the relief valve 157 falls back within a safe range (another threshold value), then the relief valve 157 returns to the closed position. Similarly, if the relief valve 157 determines that the temperature within the tank 195 exceeds a maximum threshold value, then the relief valve 157 opens to allow the excess temperature to vent out the top of the water heater 190 into the ambient environment. When the temperature within the tank 195 measured by the relief valve 157 falls back within a safe range (another threshold value), then the relief valve 157 returns to the closed position.

The heat pump assembly 140 of FIG. 1A is part of the heating system 170. As stated above, the heat pump assembly 140 in this example includes a compressor 141, an air moving device 142, an evaporator 143, and a coil 145, which can include an outflow portion 144 and an inflow portion 146. The heat pump assembly 140 takes heat energy from the ambient environment 119 and transfers it to the fluid inside the tank 195 of the water heater 190. To accomplish this process in this case, the air moving device 142, which is disposed adjacent to an aperture 148 in the wall 147 of the heat pump assembly 140, operates to draw the air from the ambient environment 119 into the cavity 149 formed by the wall 147 of the heat pump assembly 140. The air moving device 142 can be a fan, a blower, and/or any other device that can draw air from the ambient environment 119 into the cavity 149 formed by the wall 147 of the heat pump assembly 140. The air moving device 142 can have one or more discrete speeds, or can have variable speeds.

As the air from the ambient environment 119 is drawn into the cavity 149 formed by the wall 147 of the heat pump assembly 140, the air passes over the evaporator 143 disposed within the cavity 149. The evaporator 143 can have any of a number of configurations. For example, the evaporator 143 can include a number of fins. As another example, the evaporator 143 can include one or more coils that form an "S" shape. Regardless of the configuration, the evaporator 143 is designed to have a large surface area that is exposed to the air from the ambient environment 119 as the air from the ambient environment 119 passes over the evaporator 143. The evaporator 143 is made of a thermally conductive material (e.g., aluminum, copper) so that heat energy in the air from the ambient environment 119 can be absorbed by the evaporator 143.

The evaporator 143 is filled with a fluid that absorbs the heat absorbed from the air from the ambient environment 119 by the evaporator 143. Typically, the fluid is a refrigerant. Examples of such a fluid can include, but are not limited to, a hydrofluorocarbon (HFC), a chlorofluorocarbon (CFC), an isobutane, hydrogen, helium, nitrogen, and plain air. Also, such a fluid can be in any state, such as a gaseous state, when disposed in the evaporator 143.

When the fluid in the evaporator 143 is heated using the heat from the air of the ambient environment 119, the fluid can change state in the evaporator 143. For example, before being heated, the fluid can be in a liquid form, where the fluid transforms to a gaseous form when the heat transferred from the air through the evaporator is absorbed by the fluid. The fluid in the evaporator 143 is then run through the compressor 141. The compressor 141 can be disposed within the cavity 149 formed by the wall 147 of the heat pump assembly 140. The compressor 141 puts the fluid from the evaporator 143 under pressure, thereby increasing the temperature of the fluid. The compressor 141 then forces the pressurized fluid to circulate through the coil 145, which is disposed within the tank 195 and/or is wrapped around (e.g., forms part of the inner wall 192) of the tank 195. In the latter case, the coil 145 may have no direct contact with the water within the tank 195. In such a case, the heat within the fluid in the coil 145 can transfer to the coil 145, and then transfer to the inner wall 192 of the tank 195, and then transfer to the water within the tank 195.

As discussed above, the coil 145 in this case has an outflow portion 144 and an inflow portion 146. The outflow portion 144 allows the fluid to flow from the top of the tank 195 (proximate to the location of the cavity 149 formed by the wall 147 of the heat pump assembly 140) toward the bottom of the tank 195. The coil can be made of a thermally conductive material (e.g., aluminum, copper) so that heat energy in the fluid can be absorbed by the coil 145, and this heat in turn can be transferred from the coil 145 (more specifically the outflow portion 144) to the liquid in the tank 195.

As the coil 145 absorbs heat from the fluid in the coil 145, the fluid in the coil 145 loses pressure and cools, eventually changing back to a liquid state. This means that, as the outflow portion 144 of the coil 145 moves toward the bottom of the tank 195, there is relatively little heat that is transferred from the fluid through the coil 145 to the liquid in the tank 195. As a result, the liquid toward the bottom of the tank 195 may not be sufficiently heated in traditional heat pump water heaters, which do not have other supplemental sources to heat the liquid in the tank 195, such as the resistive heating element 171.

When the fluid in the coil 145 reaches the end of the outflow portion 144, the fluid travels through the inflow portion 146 of the coil 145, which returns the fluid to the evaporator 143 to repeat the process. In this way, the evaporator 143, the compressor 141, and the coil 145 form a closed loop through which the fluid, in various states, flows continuously when the heat pump 140 is in operation. The operation of one or more components (e.g., the air moving device 142, the compressor 141) can be controlled by the controller 104.

As discussed above, heat pump water heaters currently known in the art do not have additional sources of heat used to heat the water in the tank 195 aside from the heat pump 140. In other words, the heating system 170 of heat pump water heaters currently known in the art is limited to the heat pump 140. By contrast, example embodiments have a heating system 170 that uses one or more additional sources of heat to complement the heat pump 140 and make the temperature of the water within the tank more uniform from the top of the tank 195 to the bottom of the tank 195.

Put another way, the heating system 170 of the water heater 190 can include, in addition to the heat pump 140, one or more devices (or components thereof) that consume energy (e.g., electricity, natural gas, propane) during operation. An example of such a device or component of the heating system 170 can include the heating element 171 shown in FIG. 1A. In this case, there is one heating element 171 positioned toward the bottom of the tank 195 and that extends inward toward the center of the tank 195. In some cases, the heating system 170 of example embodiments can include multiple heating elements 171. Here, heating element 171 is located toward the bottom of the tank 195, approximately ⅙ the height of the tank 195 from the bottom end of the tank 195.

Those of ordinary skill in the art will appreciate that heating systems 170 for water heaters 190 can have any of a number of other configurations. In any case, the controller 104 is aware of the devices, components, ratings, positioning, and any other relevant information regarding the heating system 170 relative to the tank 195. In some cases, one or more devices of the heating system 170 can have its own local controller. In such a case, the controller 104 can communicate with a local controller of the heating system 170 using signal transfer links 105 and/or power transfer links 185.

The user 150, the power supply 135, and/or the water heater 190 (including the sensors 151 and a local controller, if any) can interact with the controller 104 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the power supply 135, and/or the water heater 190. The user 150, the power supply 135, and the water heater 190 (including portions thereof) can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof. For example, referring to FIG. 2 below, the controller 104 can include a user interface having one or more of a number of I/O devices 216 (e.g., buzzer, alarm, indicating light, pushbutton).

The controller 104, the user 150, the power supply 135, and/or the water heater 190 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor device software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the water heating system 100.

The controller 104 can be a stand-alone device or integrated with another component (e.g., the water heater 190) in the water heating system 100. When the controller 104 is a stand-alone device, the controller 104 can include a housing. In such a case, the housing can include at least one wall that forms a cavity. In some cases, the housing can be designed to comply with any applicable standards so that the controller 104 can be located in a particular environment (e.g., a hazardous environment, a high temperature environment, a high humidity environment).

The housing of the controller 104 can be used to house one or more components of the controller 104. For example, the controller 104 (which in this case includes the control engine 106, the communication module 108, the timer 110, the optional energy metering module 111, the power module 112, the storage repository 130, the hardware processor 120, the memory 122, the transceiver 124, the application interface 126, and the optional security module 128) can be disposed in a cavity formed by a housing. In alternative embodiments, any one or more of these or other components of the controller 104 can be disposed on a housing and/or remotely from a housing.

The storage repository 130 can be a persistent storage device (or set of devices) that stores software and data used to assist the controller 104 in communicating with the user 150, the power supply 135, and water heater 190 (including components thereof) within the heating system 100. In one or more example embodiments, the storage repository 130 stores one or more protocols 132, algorithms 133, and stored data 134. The protocols 132 can be any procedures (e.g., a series of method steps) and/or other similar operational procedures that the control engine 106 of the controller 104 follows based on certain conditions at a point in time. The protocols 132 can include any of a number of communication protocols 132 that are used to send and/or receive data between the controller 104 and the user 150, the power supply 135, and the water heater 190.

A protocol 132 can be used for wired and/or wireless communication. Examples of a protocol 132 can include, but are not limited to, Econet, Modbus, profibus, Ethernet, and fiberoptic. One or more of the communication protocols 132 can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the communication protocols 132 can provide a layer of security to the data transferred within the system 100.

The algorithms 133 can be any formulas, logic steps, mathematical models (e.g., load forecasting models, forward energy price model), and/or other suitable means of manipulating and/or processing data. One or more algorithms 133 can be used for a particular protocol 132. As discussed above, the controller 104 uses information (e.g., temperature measurements, flow rate measurements) provided by the sensor devices 151 to generate, using one or more protocols 132 and/or one or more algorithms 133, information related to the relative uniformity of temperature of the water along the height of the tank 195 of the water heater 190.

For example, a protocol 132 and/or an algorithm 133 can dictate when a measurement is taken by a sensor device 151 and which particular sensor devices 151 take a measurement at that point in time. As another example, a protocol 132 and/or an algorithm 133 can be used, in conjunction with measurements made by one or more sensor devices 151, by the controller 104 to determine whether a source of heat (e.g., resistive heating element 171) aside from the heat pump 140 should be operated to raise the temperature of the water toward the bottom of the tank 195 of the water heater 190. As yet another example, a protocol 132 and/or an algorithm 133 can be used by the controller 104 to suspend and/or resume operation of the heating system 170 or portion thereof. Such algorithms for equalizing the temperature of the water throughout a tank 195 of a water heater 190 can be referred to as equalizing algorithms or non-stacking algorithms.

Stored data 134 can be any data associated with the water heating system 100 (including any components thereof), any measurements taken by the sensor devices 151, time measured by the timer 110, adjustments to an algorithm 133, threshold values, user preferences, default values, results of previously run or calculated algorithms 133, and/or any other suitable data. Such data can be any type of data, including but not limited to historical data for the water heating system 100 (including any components thereof, such as the sensor devices 151 and the heating system 170), calculations, adjustments made to calculations based on actual data, and measurements taken by one or more sensor devices 151. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the power supply 135, and the water heater 190 (including components thereof) in the water heating system 100. More specifically, the control engine 106 sends information to and/or receives information from the storage repository 130 in order to communicate with the user 150, the power supply 135, and the water heater 190. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., switch 156, a sensor 151, the user 150) in the water heating system 100.

As another example, the control engine 106 can acquire the current time using the timer 110. The timer 110 can enable the controller 104 to control the heating system 170 (including any components thereof). As yet another example, the control engine 106 can direct a sensor 151 to measure a parameter (e.g., temperature, flow rate) and send the measurement by reply to the control engine 106.

Figure 3:
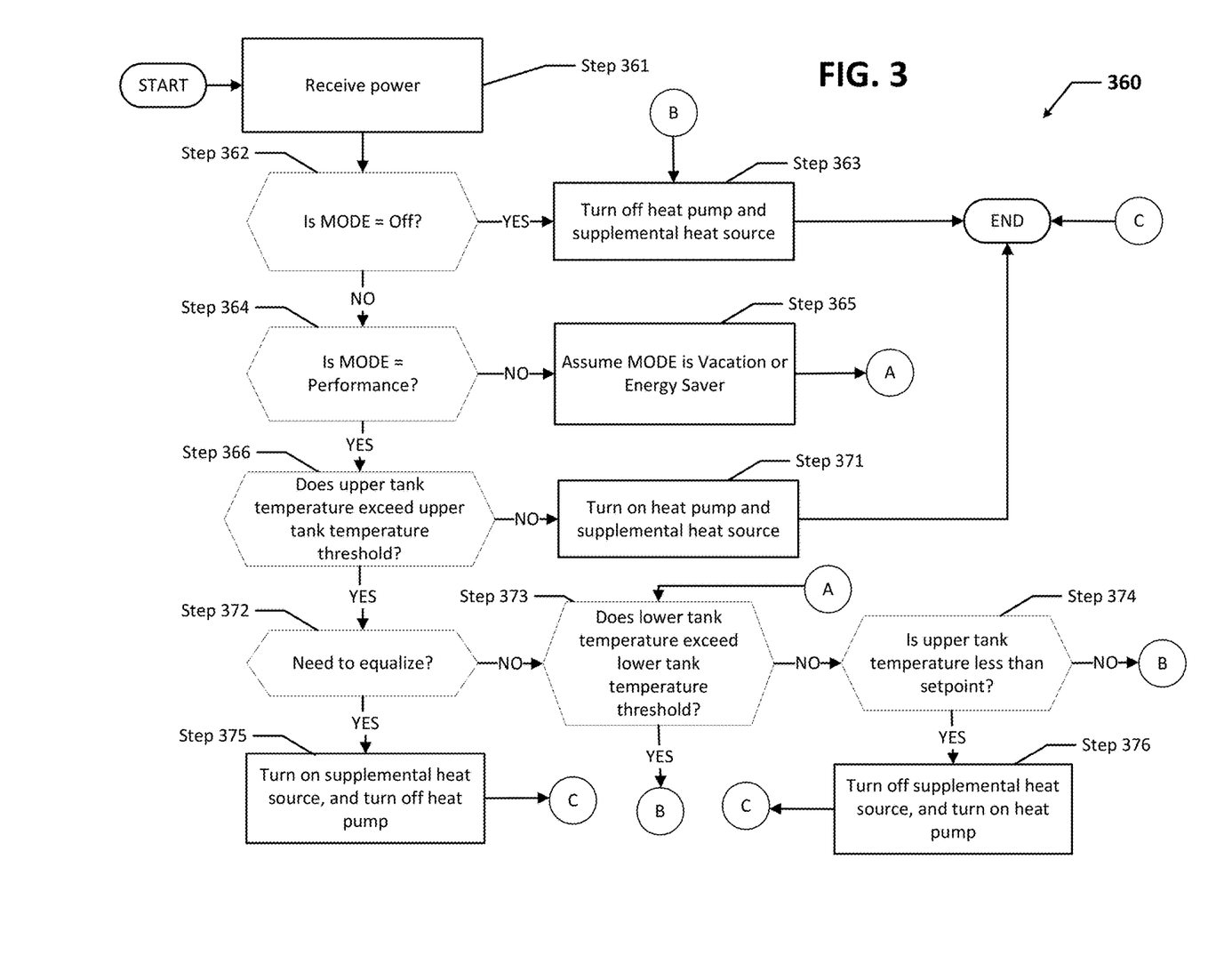
FIGS. 3 and 4 show flowcharts for operating hybrid heat pump water heaters in accordance with certain example embodiments.
Figure 4:
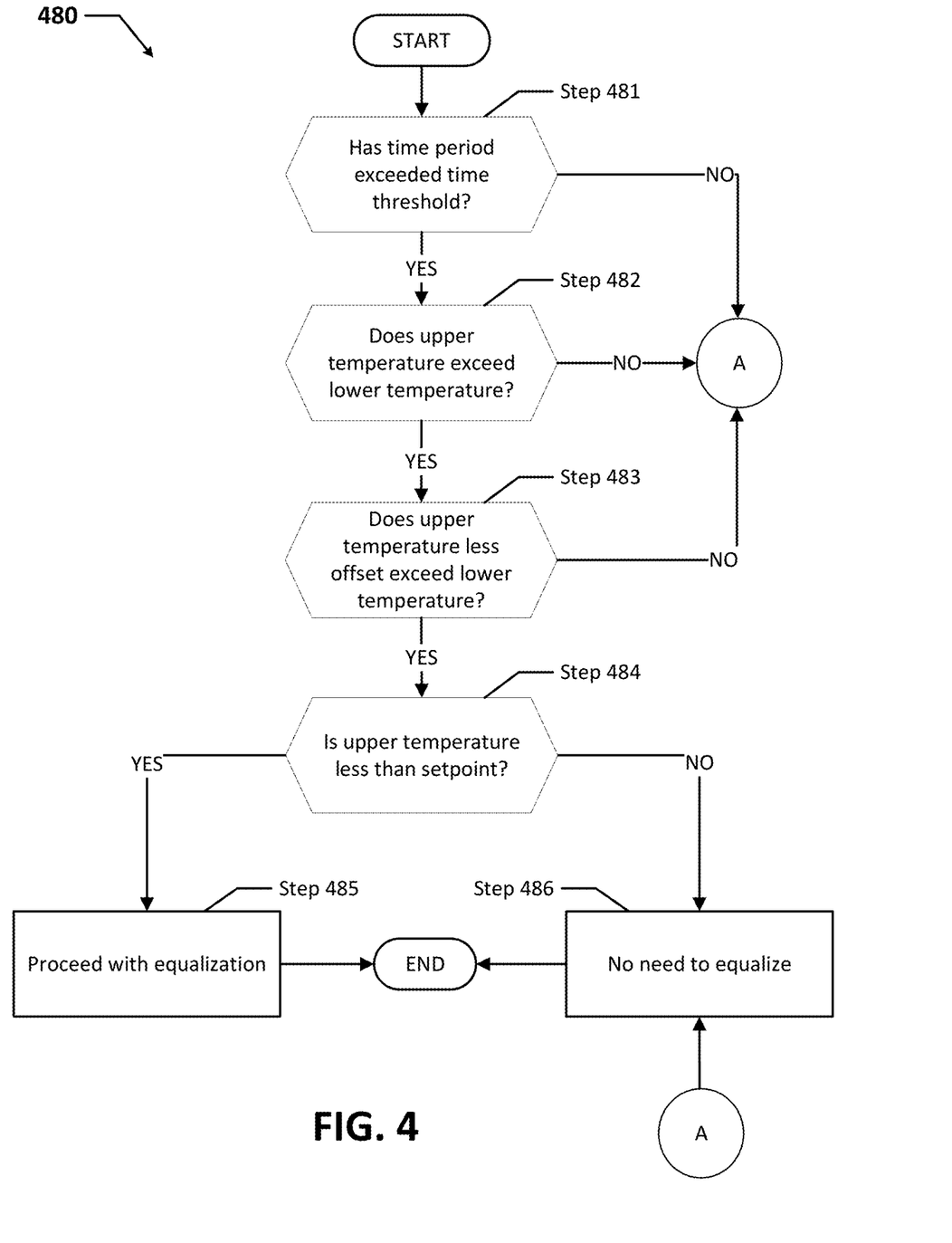

The control engine 106 can be configured to perform a number of functions that help the controller 104 make a determination as to when and how to control different components of the heating system 170 over time. For example, the control engine 106 can execute any of the protocols 132 and/or algorithms 133 stored in the storage repository 130 and use the results of those protocols 132 and/or algorithms 133 to operate the resistive heating element 171, which would heat the water toward the bottom of the tank 195 of the water heater 190. As another example, if there is an insufficient amount of heated water currently available toward the top of the tank 195 of the water heater 190, the control engine 106 can execute other protocols 132 and/or algorithms 133 and use the results of those protocols 132 and/or algorithms 133 to control one or more components (e.g., the air moving device 142, the compressor 141) of the heat pump assembly 140 to increase the temperature of the heated water toward the top of the tank 195 of the water heater 190. FIGS. 3 and 4 below provide more specific examples of how the control engine 106 functions according to certain example embodiments.

The control engine 106 can generate an alarm or some other form of communication when an operating parameter (e.g., a difference between the temperature of the water toward the top of the tank 195 of water heater 190 and the temperature of the water toward the bottom of the tank 195, temperature read by a temperature sensor 158) exceeds or falls below a threshold value (in other words, falls outside an acceptable range of values). The control engine 106 can also track measurements made by a sensor device 151 and determine a possible present or future failure of the sensor device 151 or some other component of the water heater 190 or, more generally, the water heating system 100.

In some cases, using one or more algorithms 133, the control engine 106 can predict the expected useful life of these components based on stored data 134, a protocol 132, one or more threshold values, and/or some other factor. The control engine 106 can also measure (using one or more sensors 151) and analyze the efficiency of the water heater 190 (or portion thereof) over time. An alarm can be generated by the control engine 106 when the efficiency of a component of the water heating system 100 falls below a threshold value, indicating failure of that component.

If the control engine 106 determines there is a large enough difference between the temperature of the water toward the top of the tank 195 of water heater 190 and the temperature of the water toward the bottom of the tank 195, the control engine 106 can control one or more components (e.g., the resistive heating element 171, the heat pump 140) of the heating system 170 to get the temperature of the water toward the bottom of the tank 195 of the water heater 190 to within an acceptable range of values (e.g., default values, user-selected values) of the temperature of the water toward the top of the tank 195.

The control engine 106 of the controller 104 can operate in one of any number of modes at a given time. Examples of such modes can include, but are not limited to, off, vacation mode, performance mode, energy saver mode, and sleep mode. The control engine 106 can operate in a particular mode based on one or more of a number of factors, including but not limited to input from a user 150, time, a parameter measured by a sensor device 151, and performance of a component of the heating system 170.

The control engine 106 can perform its evaluation functions and resulting actions on a continuous basis, periodically, during certain time intervals, or randomly. Further, the control engine 106 can perform this evaluation for the present time or for a period of time in the future. For example, the control engine 106 can perform forecasts to determine the temperature of heated water that will be toward the top of the tank 195 of the water heater 190 after a specified period of time and compare that with the forecast temperature of unheated water that will be toward the bottom of the tank 195 after that specified period of time. The control engine 106 can adjust a forecast (e.g., every hour, when new information from a user 150 or a sensor device 151 is received).

The control engine 106 can provide power, control, communication, and/or other similar signals to the user 150, the power supply 135, and the water heater 190 (including components thereof). Similarly, the control engine 106 can receive power, control, communication, and/or other similar signals from the user 150, the power supply 135, and the water heater 190. The control engine 106 can control each sensor 151, valve 152, and/or other component in the water heating system 100 automatically (for example, based on one or more algorithms 133 stored in the storage repository 130) and/or based on power, control, communication, and/or other similar signals received from another device through a signal transfer link 105 and/or a power transfer link 185. The control engine 106 may include a printed circuit board, upon which the hardware processor 120 and/or one or more discrete components of the controller 104 are positioned.

In certain embodiments, the control engine 106 of the controller 104 can communicate with one or more components (e.g., a network manager) of a system external to the water heating system 100. For example, the control engine 106 can interact with an inventory management system by ordering a component (e.g., a sensor device 151) to replace a sensor device 151 (e.g., temperature sensor 158-3) that the control engine 106 has determined has failed or is failing. As another example, the control engine 106 can interact with a workforce scheduling system by scheduling a maintenance crew to repair or replace a component of the water heating system 100 when the control engine 106 determines that the component requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., a user 150, a switch 156) of the water heating system 100. For example, if a user 150 operates under IEC Standard 62386, then the user 150 can have a serial communication interface that will transfer data (e.g., stored data 134) measured by the sensors 151. In such a case, the control engine 106 can also include a serial interface to enable communication with the user 150. Such an interface can operate in conjunction with, or independently of, the protocols 132 used to communicate between the controller 104 and the user 150, the power supply 135, and the water heater 190 (or components thereof).

The control engine 106 (or other components of the controller 104) can also include one or more hardware components (e.g., peripherals) and/or software elements to perform its functions. Such components can include, but are not limited to, a universal asynchronous receiver/transmitter (UART), a serial peripheral interface (SPI), an analog-to-digital converter, an inter-integrated circuit ($I^2C$), and a pulse width modulator (PWM).

The communication module 108 of the controller 104 determines and implements the communication protocol (e.g., from the protocols 132 of the storage repository 130) that is used when the control engine 106 communicates with (e.g., sends signals to, receives signals from) the user 150, the power supply 135, and the water heater 190 (or components thereof). In some cases, the communication module 108 accesses the stored data 134 to determine which communication protocol is used to communicate with a sensor 151 associated with certain stored data 134. In addition, the communication module 108 can interpret the communication protocol of a communication received by the controller 104 so that the control engine 106 can interpret the communication.

The communication module 108 can send and receive data between the power supply 135, the water heater 190 (or components thereof), and/or the users 150 and the controller 104. The communication module 108 can send and/or receive data in a given format that follows a particular protocol 132. The control engine 106 can interpret the data packet received from the communication module 108 using the protocol 132 information stored in the storage repository 130. The control engine 106 can also facilitate the data transfer between the water heater (or components thereof), the power supply 135, and a user 150 by converting the data into a format understood by the communication module 108.

The communication module 108 can send data (e.g., protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The power module 112 of the controller 104 provides power to one or more other components (e.g., timer 110, control engine 106) of the controller 104. In addition, in certain example embodiments, the power module 112 can provide power to one or more components (e.g., the heating system 170 of the water heater 190, the switch 156, a valve 152) of the water heating system 100. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112. Alternatively, the controller 104 can include a power metering module (not shown) to measure one or more elements of power that flows into, out of, and/or within the controller 104.

The power module 112 can include one or more components (e.g., a transformer, a diode bridge, an inverter, a converter) that receives power (for example, through an electrical cable) from the power supply 135 and generates power of a type (e.g., AC, DC) and level (e.g., 12V, 24V, 120V) that can be used by the other components of the controller 104 and/or by the water heater 190. For example, 240 VAC received from the power supply 135 by the power module 112 can be converted to 12 VDC by the power module 112. The power module 112 can use a closed control loop to maintain a preconfigured voltage or current with a tight tolerance at the output. The power module 112 can also protect the remainder of the electronics (e.g., hardware processor 120, transceiver 124) in the controller 104 from surges generated in the line.

In addition, or in the alternative, the power module 112 can be a source of power in itself to provide signals to the other components of the controller 104. For example, the power module 112 can be a battery. As another example, the power module 112 can be a localized photovoltaic power system. In certain example embodiments, the power module 112 of the controller 104 can also provide power and/or control signals, directly or indirectly, to one or more of the sensor devices 151. In such a case, the control engine 106 can direct the power generated by the power module 112 to one or more of the sensor devices 151. In this way, power can be conserved by sending power to the sensor devices 151 when those devices need power, as determined by the control engine 106.

The optional energy metering module 111 of the controller 104 can measure one or more components of power (e.g., current, voltage, resistance, VARs, watts) at one or more points (e.g., output of the power supply 135) associated with the water heating system 100. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor. If there is no energy metering module 111, then the controller 104 can estimate one or more components of power using one or more algorithms 133.

The hardware processor 120 of the controller 104 executes software, algorithms 133, and firmware in accordance with one or more example embodiments. Specifically, the hardware processor 120 can execute software on the control engine 106 or any other portion of the controller 104, as well as software used by the user 150, the power supply 135, and the water heater 190 (or portions thereof). The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or nonvolatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the power supply 135, and the water heater 190 (or portions thereof). The transceiver 124 can use wired and/or wireless technology. The transceiver 124 can be configured in such a way that the control and/or communication signals sent and/or received by the transceiver 124 can be received and/or sent by another transceiver that is part of the user 150, the power supply 135, and the water heater 190 (or portions thereof). The transceiver 124 can use any of a number of signal types, including but not limited to radio frequency signals.

When the transceiver 124 uses wireless technology, any type of wireless technology can be used by the transceiver 124 in sending and receiving signals. Such wireless technology can include, but is not limited to, Wi-Fi, visible light communication, Zigbee, mobile apps, text/email messages, cellular networking, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the power supply 135, and the water heater 190 (or portions thereof) can be part of the stored data 134 (or similar areas) of the storage repository 130.

Optionally, in one or more example embodiments, the security module 128 secures interactions between the controller 104, the user 150, the power supply 135, and the water heater 190 (or portions thereof). More specifically, the security module 128 authenticates communication from software based on security keys verifying the identity of the source of the communication. For example, user software may be associated with a security key enabling the software of the user 150 to interact with the controller 104 and/or the sensors 151. Further, the security module 128 can restrict receipt of information, requests for information, and/or access to information in some example embodiments.

Figure 2:
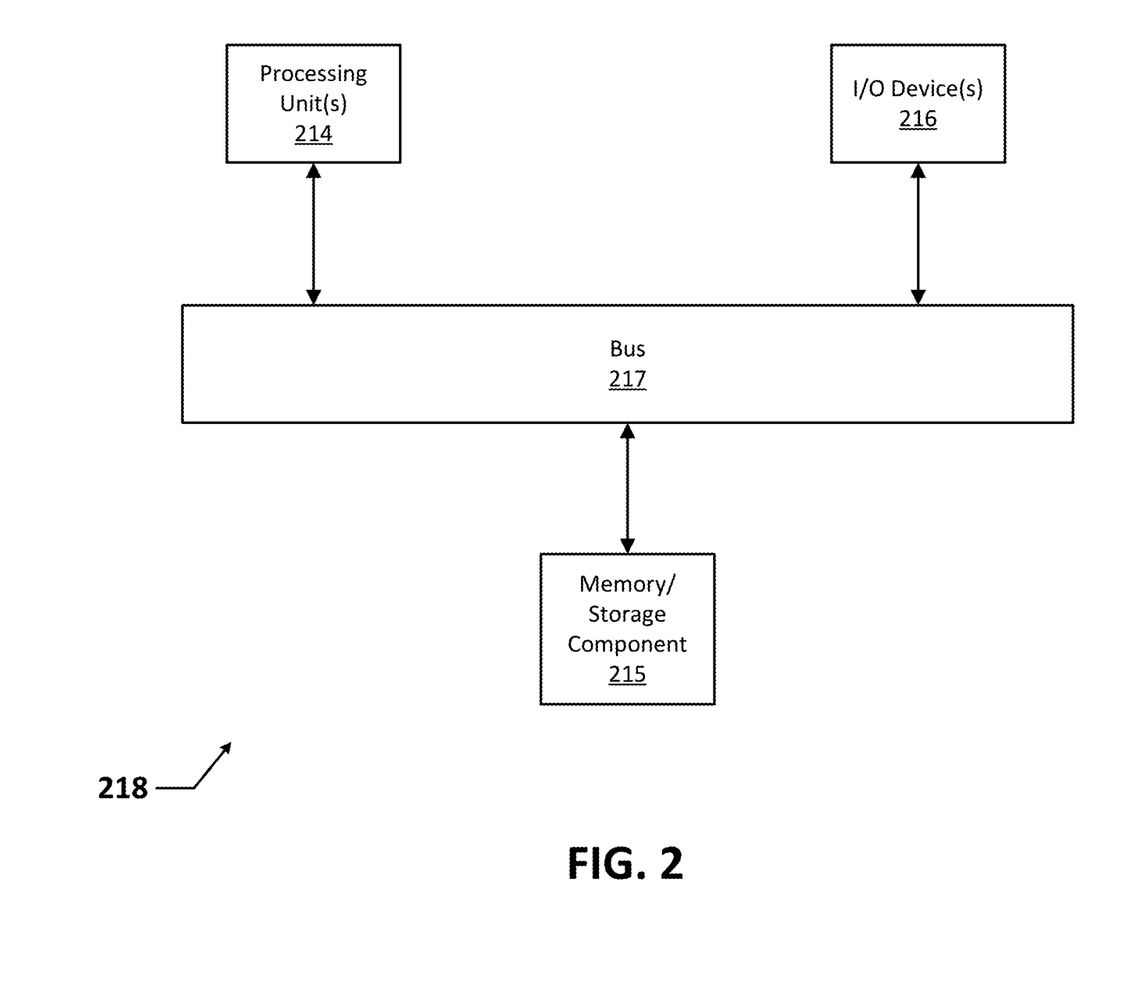
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain example embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 218 includes at least the minimal processing, input, and/or output means necessary to practice one or more embodiments.

Further, those skilled in the art will appreciate that one or more elements of the aforementioned computer device 218 can be located at a remote location and connected to the other elements over a network in certain example embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

FIGS. 3 and 4 each show a flowchart for equalizing water temperature within a tank of a water heater in accordance with certain example embodiments. Specifically, FIG. 3 shows an example method for operating a water heater that includes equalization of water temperature within a tank, and FIG. 4 shows an example method of determining whether to equalize water temperature within a tank. While the various steps in these flowcharts are presented and described sequentially, one of ordinary skill in the art will appreciate that some or all of the steps can be executed in different orders, combined or omitted, and some or all of the steps can be executed in parallel depending upon the example embodiment. Further, in one or more of the example embodiments, one or more of the steps described below can be omitted, repeated, and/or performed in a different order. For example, the process of equalizing water temperature within the tank 195 can be a continuous process, and so the START and END steps shown in FIGS. 3 and 4 can merely denote the start and end of a particular series of steps within a continuous process.

In addition, a person of ordinary skill in the art will appreciate that additional steps not shown in FIGS. 3 and 4 can be included in performing these methods in certain example embodiments. Accordingly, the specific arrangement of steps should not be construed as limiting the scope. In addition, a particular computing device, as described, for example, in FIG. 2 above, is used to perform one or more of the steps for the methods described below in certain example embodiments. For the methods described below, unless specifically stated otherwise, a description of the controller 104 performing certain functions can be applied to the control engine 106 of the controller 104.

For clarity, the controller 104 described herein can control other aspects of the system 100 while performing the functions described above and in the methods of FIGS. 3 and 4 below. For example, the controller 104 can control the one or more valves 152 (e.g., valve 152-1) independently of, or in conjunction with, the functions described herein. Further, the controller 104 can control the heating system 170 independently of, or in conjunction with, other components of the system 100. For example, a user 150 can adjust a setpoint, and the controller 104 can control the heating system 170 (and thus equalize the water temperature in the tank 195) based on the new setpoint.

Referring to FIGS. 1A-4, the example method 360 of FIG. 3 begins at the START step and proceeds to step 361, where power is received. Power can be received by the system 100 or certain components thereof. For example, power can be received by the controller 104. The power can be received by the power supply 135. Alternatively, the power can be received by an energy storage device or some other aspect of the power module 112 of the controller 104.

In step 362, a determination is made as to whether the mode of operation is Off. The mode of operation can be with respect to the controller 104. As discussed above, the controller 104 can operate in one of a number of modes of operation at a given point in time. Examples of such modes of operation can include, but are not limited to, off, vacation mode, performance mode, energy saver mode, and sleep mode. When the controller 104 is in Off mode, no control of the heating system 170 is administered. If the mode of operation is Off, then the process proceeds to step 363. If the mode of operation is not Off, then the process proceeds to step 364.

In step 363, the heat pump 140 and the supplemental heat source (in this case, the resistive heating element 171) are turned off. The heat pump 140 and the supplemental heat source can be disabled or turned off (or maintained in the off position) by the controller 104. When step 363 is completed, the process proceeds to the END step. Alternatively, the process can revert to step 362, where the controller 104 waits in a holding period until its operating mode changes. In step 364, a determination is made as to whether the mode of operation is Performance. Again, the mode of operation can be with respect to the controller 104. When the controller 104 is in Performance mode, the controller 104 controls substantially all aspects of the heating system 170. If the mode of operation is Performance, then the process proceeds to step 366. If the mode of operation is not Performance, then the process proceeds to step 365.

In step 365, it is assumed that the mode of operation is Vacation, Energy Saver, Standby, or some similar mode of operation. Again, the mode of operation can be with respect to the controller 104. When the controller 104 is in Vacation mode, Energy Saver mode, Standby mode, or some similar mode of operation, the controller 104 has limited control of the heating system 170. When step 365 is complete, the process proceeds to step 373.

In step 366, a determination is made as to whether the upper tank temperature exceeds an upper tank temperature threshold. The upper tank temperature refers to the temperature of the water in the tank 195 toward the top of the tank 195. The upper tank temperature can be measured by one or more sensor devices 151 (e.g., temperature sensor 158-1) that measure the temperature of the water within the tank 195. When multiple temperature sensors 158 are used, they can be placed at different locations within the tank 195. For example, one temperature sensor 158 (e.g., temperature sensor 158-1) can measure a temperature of the water in the middle toward the top of the tank 195, and another temperature sensor 158 can measure a temperature of the water along the inner wall 192 toward the top of the tank 195.

A temperature measured by a temperature sensor 158 can be an absolute temperature, an average temperature, or a differential temperature (e.g., the difference between the temperature measured by temperature sensor 158-1 and the temperature measured by another temperature sensor 158). The one or more temperature sensors 158 can measure temperature based on instructions received by the controller 104. Once the temperatures are measured, the temperature sensors 158 can send the measurements to the controller 104. The controller 104 then evaluates the upper tank temperature measured by the one or more sensor devices 151 by comparing the upper tank temperature with the upper tank temperature threshold.

The determination can be made by the controller 104 using one or more protocols 132 and/or algorithms 133 stored in the storage repository 130. The upper tank temperature threshold is a threshold value that can be part of the stored data 134 of the storage repository 130. The upper tank temperature threshold can be some minimum temperature at which the water toward the top end of the tank 195 can be considered heated water. The upper tank temperature threshold can be a set point. Alternatively, the upper tank temperature threshold can be a set point differential. If the upper tank temperature exceeds the upper tank temperature threshold, then the process proceeds to step 372. If the upper tank temperature does not exceed the upper tank temperature threshold, then the water in the tank 195 is not sufficiently heated and the process proceeds to step 371.

In step 371, the heat pump 140 and the supplemental heat source (in this case, the resistive heating element 171) are turned on. The heat pump 140 and the supplemental heat source can be turned on (or maintained in the on position) by the controller 104. When step 371 is completed, the process proceeds to the END step. Alternatively, the process can revert to step 366, where the controller 104 continually or periodically compares the upper tank temperature against the upper tank temperature threshold until the upper tank temperature exceeds the upper tank temperature threshold.

In step 372, a determination is made as to whether an equalization protocol needs to be executed. The equalization protocol can be executed by the controller 104. The equalization protocol can be performed by manipulating some or all of the heating system 170. There can be multiple equalization protocols available to the controller 104. In such a case, the controller 104 can select one of the equalization protocols based on one or more of a number of factors, including but not limited to time, input from a user 150, historical data, temperature values, and default settings. FIG. 4 below shows a method by which a determination can be made as to whether to execute an equalization protocol. If an equalization protocol needs to be executed, then the process proceeds to step 375. If an equalization protocol does not need to be executed, then the process proceeds to step 373.

In step 373, a determination is made as to whether the lower tank temperature exceeds a lower tank temperature threshold. The lower tank temperature refers to the temperature of the water in the tank 195 toward the bottom of the tank 195. The lower tank temperature can be measured by one or more sensor devices 151 (e.g., temperature sensor 158-2) that measure the temperature of the water within the tank 195. When multiple temperature sensors 158 are used, they can be placed at different locations within the tank 195. For example, one temperature sensor 158 (e.g., temperature sensor 158-2) can measure a temperature of the water in the middle toward the bottom of the tank 195, and another temperature sensor 158 can measure a temperature of the water along the inner wall 192 toward the bottom of the tank 195.

A temperature measured by a temperature sensor 158 can be an absolute temperature, an average temperature, or a differential temperature (e.g., the difference between the temperature measured by temperature sensor 158-2 and the temperature measured by another temperature sensor 158). The one or more temperature sensors 158 can measure temperature based on instructions received by the controller 104. Once the temperatures are measured, the temperature sensors 158 can send the measurements to the controller 104. The controller 104 then evaluates the lower tank temperature measured by the one or more sensor devices 151 by comparing the lower tank temperature with the lower tank temperature threshold. The lower tank temperature threshold can be the same as, or different (e.g., lower) than, the upper tank temperature threshold.

The determination can be made by the controller 104 using one or more protocols 132 and/or algorithms 133 stored in the storage repository 130. The lower tank temperature threshold is a threshold value that can be part of the stored data 134 of the storage repository 130. The lower tank temperature threshold can be some minimum temperature at which the water toward the bottom of the tank 195 can be considered heated water. The lower tank temperature threshold can be a set point. Alternatively, the lower tank temperature threshold can be a set point differential. If the lower tank temperature exceeds the lower tank temperature threshold, then the process reverts to step 363. If the lower tank temperature does not exceed the lower tank temperature threshold, then the process proceeds to step 374.

In step 374, a determination is made as to whether the upper tank temperature is less than a setpoint value. The upper tank temperature is the same as described above with respect to step 366. The setpoint value is a temperature value of the heated water that is set by a user 150. The setpoint value is the desired temperature of the heated water that leaves the tank 195 (through the outlet tube 109) for use by the user 150. If the upper tank temperature is less than a setpoint value, then the process proceeds to step 376. If the upper tank temperature is not less than a setpoint value, then the process reverts to step 363.

In step 375, the heat pump 140 is turned off, and the supplemental heat source (in this case, the resistive heating element 171) is turned on. The heat pump 140 can be disabled or turned off (or maintained in the off position) by the controller 104. Similarly, the supplemental heat source can be turned on (or maintained in the on position) by the controller 104. When step 375 is completed, the process proceeds to the END step. Alternatively, the process can revert to step 372, where the controller 104 continually or periodically evaluates whether equalization of the water temperature in the tank needs to continue.

In step 376, the heat pump 140 is turned on, and the supplemental heat source (in this case, the resistive heating element 171) is turned off. The heat pump 140 can be turned on (or maintained in the on position) by the controller 104. Similarly, the supplemental heat source can be disabled or turned off (or maintained in the off position) by the controller 104. When step 376 is completed, the process proceeds to the END step. Alternatively, the process can revert to step 374, where the controller 104 continually or periodically evaluates whether the upper tank temperature continues to be less than a setpoint value.

The method 480 of FIG. 4 describes how a determination can be made as to whether to execute an equalization protocol. The example method 480 of FIG. 4 begins at the START step and proceeds to step 461, where a received determination is made as to whether an amount of time has exceeded a time threshold. The amount of time can be tracked by the timer 110 of the controller 104. The amount of time can be with reference to any event (e.g., the most recent operation to equalize the water temperature in the tank 195) or time (e.g., 2:00 in the afternoon). The reference point for the period of time can be based on a protocol 132 and/or algorithm 133 stored in the storage repository 130.

The controller 104 evaluates the amount of time measured by the timer 110 by comparing the amount of time with the time threshold. The determination can be made by the controller 104 using one or more protocols 132 and/or algorithms 133 stored in the storage repository 130. The time threshold is a threshold value that can be part of the stored data 134 of the storage repository 130. The time threshold can be some minimum amount of time that promotes energy conservation, provides for efficient equalization of temperature in the tank 195, or is based on some other purpose or factor. If the amount of time exceeds the time threshold, then the process proceeds to step 482. If the amount of time does not exceed the time threshold, then the process proceeds to step 486.

In step 482, a determination is made as to whether the upper temperature (the water temperature toward the top of the tank 195) exceeds the lower temperature (the water temperature toward the bottom of the tank 195). The temperatures can be measured by one or more sensor devices 151 (e.g., temperature sensor 158-1, temperature sensor 158-2) that measure the temperature of the water at a particular location within the tank 195. When multiple temperature sensors 158 are used, as in this case, they can be placed at different locations within the tank 195. For example, one temperature sensor 158 (e.g., temperature sensor 158-1) can measure a temperature of the water toward the top of the tank 195, and another temperature sensor 158 (e.g., temperature sensor 158-2) can measure a temperature of the water toward the bottom of the tank 195.

A temperature measured by a temperature sensor 158 can be an absolute temperature or a differential temperature (e.g., the difference between the temperature measured by temperature sensor 158-1 and the temperature measured by temperature sensor 158-2). The temperature sensors 158 can measure temperature based on instructions received by the controller 104. Once the temperatures are measured, the temperature sensors 158 can send the measurements to the controller 104.

Once the controller 104 receives the one or more temperature measurements, the controller 104 evaluates those temperature measurements. Specifically, in this example, the controller 104 determines whether the temperature measurement toward the top of the tank 195, measured by temperature sensor 158-1, exceeds the temperature measurement toward the bottom of the tank 195, measured by temperature sensor 158-2. The determination can be made by the controller 104 using one or more protocols 132 and/or algorithms 133 stored in the storage repository 130. If the temperature measurement toward the top of the tank 195 exceeds the temperature measurement toward the bottom of the tank 195, then the process proceeds to step 483. If the temperature measurement toward the top of the tank 195 does not exceed the temperature measurement toward the bottom of the tank 195, then the process proceeds to step 486.

In step 483, a determination is made as to whether the upper temperature of the tank 195 less an offset exceeds the lower temperature of the tank 195. The temperatures can be measured in the same way described above with respect to step 482. The offset is some quantity (e.g., a temperature amount). The offset can be based on input from a user 150, historical data, current temperature in the tank 195, time, and/or any of a number of other factors. The offset can be provided to the controller 104 or determined by the controller 104 using one or more protocols 132 and/or algorithms 133 stored in the storage repository 130. If the upper temperature of the tank 195 less an offset exceeds the lower temperature of the tank 195, then the process proceeds to step 484. If the upper temperature of the tank 195 less an offset does not exceed the lower temperature of the tank 195, then the process proceeds to step 486.

In step 484, a determination is made as to whether the upper temperature of the tank 195 is less than a setpoint. The setpoint can be substantially the same as what is described above in step 374 of FIG. 3. The determination can be made by the controller 104 using one or more protocols 132 and/or algorithms 133 stored in the storage repository 130. If the upper temperature of the tank 195 is less than the setpoint, then the process proceeds to step 485. If the upper temperature of the tank 195 is not less than the setpoint, then the process proceeds to step 486.

In step 485, the decision is made to proceed with equalization of the water temperature in the tank 195. In step 486, the decision is made to not equalize the temperature of the water in the tank 195. After step 485 or step 486 are completed, the method 480 of FIG. 4 ends at the END step.

Example embodiments can be used to equalize water temperature within a tank of a heat pump water heater by controlling multiple components (e.g., the heat pump, one or more resistive heating elements) of the heating system. To conserve energy, example embodiments can monitor conditions in the tank of the heat pump water heater to determine when a protocol to equalize the water temperature should be employed. This determination can be performed in real time. Example embodiments can also control other various aspects (aside from the heating system) of a heat pump water heater to optimize energy efficiency and reduce energy consumption. Example embodiments can also lower costs and increase the useful life of a heat pump water heater, including its various components. Example embodiments can also increase the satisfaction of a user by providing substantially consistent heated water temperature for each use, even when large quantities of water are used at one time.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:
1. A water heater comprising:
a tank;
an inlet line that delivers unheated water to the tank;
an outlet line that draws heated water from the tank for a hot water demand;

a heat pump disposed adjacent to a first portion of the tank, wherein the heat pump applies heat to transform the unheated water to heated water in the first portion of the tank;

a supplemental heat source disposed within a second portion of the tank, wherein the supplemental heat source further applies heat to transform the unheated water to heated water in the second portion of the tank;

a first temperature sensor configured to measure a first temperature toward a top end of the tank;

a second temperature sensor configured to measure a second temperature toward a bottom end of the tank; and a controller in electrical communication with the heat pump, the supplemental heat source, the first temperature sensor, and the second temperature sensor, wherein the controller is configured to:

determine if the first temperature exceeds the second temperature by a predetermined amount; and if the first temperature exceeds the second temperature by the predetermined amount, activate the supplemental heating source and deactivate the heat pump to equalize a temperature of water in the tank.

2. The water heater of claim 1, wherein the first portion of the tank is toward the top end of the tank, and wherein the second portion of the tank is toward the bottom end of the tank.

3. The water heater of claim 1, further comprising:
a first valve communicably coupled to the controller, wherein the first valve controls the unheated water flowing through the inlet line, wherein the controller operates the first valve.

4. The water heater of claim 3, further comprising:
a second valve communicably coupled to the controller, wherein the second valve controls the heated water flowing through the outlet line, wherein the controller operates the second valve.

5. The water heater of claim 1, wherein the heat pump comprises:
an air moving device for drawing in ambient air;
an evaporator disposed within a housing of the water heater adjacent to the air moving device and the first portion of the tank, wherein the evaporator holds an evaporator fluid that heats when the ambient air passes over the evaporator to generate heated evaporator fluid;
a compressor the receives and compresses the heated evaporator fluid to generate compressed heated evaporator fluid; and
a coil disposed around the tank, wherein the compressed heated evaporator fluid flows through the coil, wherein heat from the compressed heated evaporator fluid is transferred through the coil to the unheated water in the tank to transition the compressed heated evaporator fluid to the evaporator fluid.

6. The water heater of claim 5, wherein the coil winds around the tank from the first portion of the tank to the second portion of the tank.

7. The water heater of claim 6, wherein the coil returns to the evaporator to form a closed loop.

8. The water heater of claim 7, wherein the supplemental heat source is used when there is an insufficient amount of compressed heated evaporator fluid within the coil at the second portion of the tank.

9. The water heater of claim 8, wherein the insufficient amount of compressed heated evaporator fluid is determined using a temperature sensor that measures a temperature at the second portion of the tank.

10. The water heater of claim 1, further comprising:
a cutout switch that cuts off power to the heat pump and the supplemental heat source when a temperature of the heated water exceeds a threshold value.

11. The water heater of claim 1, wherein the coil winds around the tank from the first portion of the tank to the second portion of the tank.

* * * * *